United States Patent
Yang et al.

(10) Patent No.: US 10,114,413 B2
(45) Date of Patent: Oct. 30, 2018

(54) ELECTRONIC BAG AND METHOD FOR CONTROLLING THE SAME

(71) Applicant: SHENZHEN ROYOLE TECHNOLOGIES CO. LTD., Shenzhen (CN)

(72) Inventors: Fan Yang, Shenzhen (CN); Chao Jiang, Shenzhen (CN); Zhanchao Liu, Shenzhen (CN); Ji Wang, Shenzhen (CN); Chao Han, Shenzhen (CN); He Li, Shenzhen (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/361,775

(22) Filed: Nov. 28, 2016

(65) Prior Publication Data

US 2017/0177024 A1 Jun. 22, 2017

(30) Foreign Application Priority Data

Dec. 22, 2015 (CN) .................... 2015 2 1077236 U

(51) Int. Cl.
*G06F 1/16* (2006.01)
*G06F 3/0488* (2013.01)
(Continued)

(52) U.S. Cl.
CPC ............... *G06F 1/163* (2013.01); *A45C 3/00* (2013.01); *A45C 3/001* (2013.01); *A45C 3/02* (2013.01);
(Continued)

(58) Field of Classification Search
CPC ...... G06F 1/163; G06F 1/1652; G06F 3/0488; G06F 3/04883; G06F 3/165; G06F 3/167;
(Continued)

(56) References Cited

U.S. PATENT DOCUMENTS 7,805,114 B1* 9/2010 Quintana ................ G06F 1/163
370/338
9,223,494 B1* 12/2015 DeSalvo ............... G06F 3/0488
(Continued)

FOREIGN PATENT DOCUMENTS

JP 59-189532 12/1984
JP 62-40698 U 3/1987
(Continued)

OTHER PUBLICATIONS

Piotr Boruslawski, "Brakepack by artefact solves the failed dialogue between cyclists and motorists", May 14, 2015 , XP055353625.
(Continued)

*Primary Examiner* — Tom Sheng
(74) *Attorney, Agent, or Firm* — Hauptman Ham, LLP

(57) ABSTRACT

The present disclosure provides an electronic bag. The electronic bag includes a bag body equipped with a strap. The electronic bag further includes a display screen and a first touch panel which is configured to control the display screen to display different patterns. The display screen is arranged on an external surface of the bag body. The first touch panel is arranged on the strap. A method for controlling the electronic bag is also disclosed.

20 Claims, 4 Drawing Sheets

(51) Int. Cl.
  A45C 15/00    (2006.01)
  A45F 3/04     (2006.01)
  A45C 3/00     (2006.01)
  A45C 3/02     (2006.01)
  A45C 5/03     (2006.01)
  A45C 13/00    (2006.01)
  A45F 3/00     (2006.01)
  G06F 3/16     (2006.01)
  G09G 5/36     (2006.01)
  A45C 5/02     (2006.01)

(52) U.S. Cl.
  CPC .......... A45C 5/02 (2013.01); A45C 5/03 (2013.01); A45C 13/001 (2013.01); A45C 15/00 (2013.01); A45F 3/005 (2013.01); A45F 3/04 (2013.01); G06F 1/1652 (2013.01); G06F 3/04883 (2013.01); G06F 3/165 (2013.01); G09G 5/36 (2013.01); A45F 2003/001 (2013.01); G06F 1/1692 (2013.01); G06F 2203/04102 (2013.01)

(58) Field of Classification Search
  CPC ......... G06F 1/1692; G06F 2203/04102; A45C 3/00; A45C 3/001; A45C 3/02; A45C 5/02; A45C 5/03; A45C 13/001; A45C 15/00; A45F 3/005; A45F 3/04; A45F 2003/001; G09G 5/36
  See application file for complete search history.

(56) References Cited

U.S. PATENT DOCUMENTS

| | | | | |
|---|---|---|---|---|
| 9,781,243 | B1* | 10/2017 | Huang | .............. H04M 1/72527 |
| 2008/0156606 | A1 | 7/2008 | Entner | |
| 2011/0051349 | A1* | 3/2011 | Daley, III | ............. G06F 1/1628 |
| | | | | 361/679.27 |
| 2011/0283241 | A1 | 11/2011 | Miller et al. | |
| 2013/0298080 | A1* | 11/2013 | Griffin | .................. G06F 3/0487 |
| | | | | 715/834 |
| 2015/0133193 | A1* | 5/2015 | Stotler | .................... G06F 1/163 |
| | | | | 455/557 |
| 2015/0227164 | A1 | 8/2015 | Laycock et al. | |
| 2015/0279171 | A1* | 10/2015 | Hyde | ................. G06F 3/04842 |
| | | | | 340/815.4 |
| 2015/0279172 | A1* | 10/2015 | Hyde | .................... G06Q 10/10 |
| | | | | 340/815.4 |

FOREIGN PATENT DOCUMENTS

| | | |
|---|---|---|
| JP | 7-36607 | 7/1995 |
| JP | 11-143634 | 5/1999 |
| JP | 2003-343 | 1/2003 |
| JP | 2003-84680 | 3/2003 |
| JP | 2005-18048 | 1/2005 |
| JP | 3116814 | 11/2005 |
| JP | 3121960 | 5/2006 |
| JP | 2011-10766 | 1/2011 |
| JP | 5531612 B2 | 6/2014 |
| JP | 3194774 | 11/2014 |
| WO | 2013/150665 | 10/2013 |

OTHER PUBLICATIONS

Communication pursuant to Article 94(3) EPC dated Feb. 15, 2018 from corresponding application No. EP 16198925.6.

Office Action dated Dec. 26, 2017 from corresponding application No. JP 2016-245698.

Office Action dated Mar. 7, 2018 from corresponding application No. KR 10-2016-0176475.

* cited by examiner

ELECTRONIC BAG AND METHOD FOR CONTROLLING THE SAME

CROSS REFERENCE TO RELATED APPLICATIONS

This application claims priority to Chinese Patent Application No, 201521077236.1, entitled "ELECTRONIC BAG", filed on Dec. 22, 2015, which is hereby incorporated in its entireties by reference.

FIELD OF THE TECHNICAL

The present disclosure relates to bag, and particularly to an electronic bag and a method of controlling the electronic bag.

BACKGROUND

In daily life, people often keep different kinds of goods in different kinds of bags. The bags bring convenience to daily life. With the development of living standards, more and more kinds of bags are developed to satisfy user's different needs. However, presently, most kinds of bags just have storage function.

SUMMARY

The present disclosure provides an electronic bag with various functions.

The electronic bag comprises: a bag body equipped with a first strap; a display screen arranged on an external surface of the bag body; and a first touch panel arranged on the first strap and controlling the display screen to display different patterns by sensing different touch gestures.

Wherein, the first touch panel comprises a first touch sensor and a first controller. The first touch sensor senses a touch gesture performed on the first touch sensor, and the first controller controls the display screen to display a pattern corresponding to the touch gesture.

Wherein, the pattern corresponding to the touch gesture is preset and stored in the first controller beforehand.

Wherein, a track of the pattern corresponding to the touch gesture is the same as that of the touch gesture.

Wherein, the electronic bag further comprises an audio player, and the first touch panel is further electrically coupled to the audio player to control audio signals of the audio player.

Wherein, the electronic bag further comprises an audio player and a second touch panel, and the second touch panel is electrically coupled to the audio player to control audio signals of the audio player.

Wherein, the second touch panel is arranged on the first strap.

Wherein, the bag body is further equipped with a second strap, and the second touch panel is arranged on the second strap.

Wherein, the first touch panel is a flexible touch panel.

Wherein, the second touch panel is a flexible touch panel.

Wherein, the audio player is arranged on a bottom of the bag body.

Wherein, the display screen is an LED lattice screen.

The present disclosure further provides a method for controlling an electronic bag. The method comprises: sensing a touch gesture acting on a flexible touch panel mounted on a strap of the electronic bag; and controlling a display screen mounted on the electronic bag to display a pattern corresponding to the touch gesture.

Comparing with a traditional bag, besides having storage function, the electronic bag provided by the present disclosure can display different patterns according to user's needs. Therefore, the electronic bag includes multiple functions, and possesses good application prospect.

DETAILED DESCRIPTION OF ILLUSTRATED EMBODIMENTS

Figure 1:
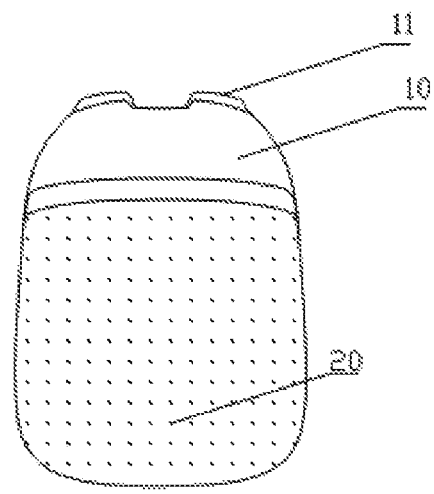
FIG. 1 is a front view of an electronic bag in accordance with an embodiment of the present disclosure.
Figure 2:
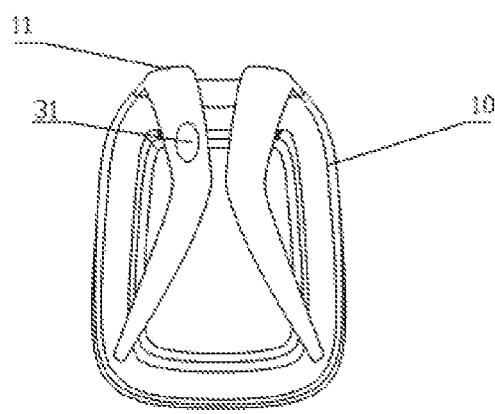
FIG. 2 is a back view of an electronic bag in accordance with the embodiment of the present disclosure.

To understand the above-mentioned purposes, features and advantages of the present disclosure more clearly, the present disclosure will be further described in detail below in combination with the accompanying drawings and the specific implementations. It should be noted that, the embodiments of the present application and the features in the embodiments may be combined with one another without conflicts.

Many specific details will be described below for sufficiently understanding the present disclosure. However, the present disclosure may also be implemented by adopting other manners different from those described herein. Accordingly, the protection scope of the present disclosure is not limited by the specific embodiments disclosed below.

From FIGS. 1-2 and FIGS. 5-6, an electronic bag in accordance with an embodiment of the present disclosure is shown. The electronic bag includes a bag body 10 equipped with two straps 11. In this embodiment, the electronic bag further includes a display screen 20 and a first touch panel 31 which is configured to control the display screen 20 to display different patterns. The display screen 20 is arranged on an external surface of the bag body 10. The first touch panel 31 is arranged on the strap 11. An area of the first touch panel 31 may be smaller than that of the display screen 20. In an alternative embodiment, the bag body 11 may be equipped with one strap.

In the embodiment, the electronic bag is a backpack. In an alternative embodiment, the electronic bag may be a shoulder bag, a waist bag, a brief bag, a hand bag, a messenger bag, or a suitcase.

In the embodiment, the electronic bag includes one display screen (the display screen 20). In an alternative embodiment, the electronic bag may include two or more display screens.

In the embodiment, the display screen 20 is arranged on a front surface of the bag body 10, that is, the display screen 20 is arranged opposite to the strap 11. In an alternative embodiment, the display screen 10 can be arranged on a side surface of the bag body 10, adjacent to the strap 11.

In the embodiment, the display screen 20 can be an LED lattice screen or a flexible display screen.

In the embodiment, the display screen 20 is substantially rectangular. In an alternative embodiment, the display screen 20 can be a display screen of arbitrary shape, for example, a round display screen, an elongated display screen, or an irregular display screen.

In the embodiment, by displaying different patterns on the display screen 20, an appearance of the bag body 10 can be changed. Specifically, sliding operations and/or tap operations performed on the first touch panel 31 are used to control the display screen 20 to display patterns.

Specifically, a specific pattern can be displayed on the display screen 20 according to user's need. The specific pattern can be a warning pattern or an advertising pattern. The warning pattern can be a left turn sign, a right turn sign, a stop sign, or an acceleration sign.

In the embodiment, the first touch panel 31 is arranged on the strap 11, thus a user is facilitated to perform any operations on the first touch panel 31 to control the display screen 20 to display different patterns.

In the embodiment, the first touch panel 31 is a flexible touch panel.

In the embodiment, the first touch panel 31 can be a resistive touch panel, a capacitive touch panel, an infrared touch panel, or a surface acoustic wave touch panel.

In the embodiment, the first touch panel 31 can be fixed to the strap 11 via screws, clips, or magic tapes. In this embodiment, one touch panel (that is, the first touch panel 31) is arranged on the strap. In an alternative embodiment, a number of touch panels can be arranged on the strap 11.

Figure 7:
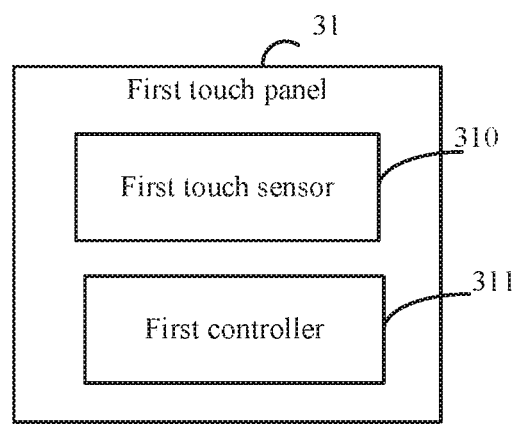
FIG. 7 is a block diagram of a first touch panel in accordance with the embodiment of the present disclosure.

Referring to FIG. 7, the first touch panel 31 includes a first touch sensor 310 and a first controller 311. The first controller 311 may be mounted on the strap 11 or in the bag body 10. The electronic bag includes a power module (not shown) configured to provide power to the first touch sensor 310 and the first controller 311. The first touch sensor 310 is configured to sense a touch gesture performed on the first touch panel 31. The first controller 311 is electrically coupled to the display screen 20 and configured to generate a control command according to the touch gesture to control the display screen 20 to display a corresponding pattern.

When a touch gesture is performed on the first touch panel 31, the first touch sensor 310 senses the touch gesture, and the first controller 311 generates a control command according to the touch gesture to control the display screen 20 to display a corresponding pattern. Specifically, in the embodiment, the first controller 311 is configured to control the display screen 20 to display a preset pattern according to the touch gesture. Many preset patterns are stored in the first controller 311 beforehand. Each preset pattern corresponds to one touch trace. When the touch gesture meets a predetermined touch trace, a corresponding preset pattern will be performed. For example, if the user slides towards right on the first touch panel 31, a right turn sign is displayed on the display screen 20. If the user slides downwardly on the first touch panel 31, a stop sign is displayed on the display screen 20. If the user slides upwardly on the first touch panel 31, an acceleration sign is displayed on the display screen 20. In an alternative embodiment, the first controller 311 is configured to control the display screen 20 to display a pattern which track is the same as that of the touch gesture. For example, when the user draws a circle on the first touch panel 31, a circle is displayed on the display screen 20. When the user writes "stop" on the first touch panel 31, "stop" is displayed on the display screen 20. As the track of the displayed pattern is the same as that of the touch gesture, the display screen 20 can be controlled to display different patterns conveniently.

Figure 8:
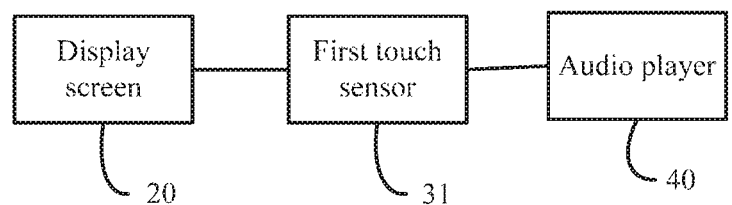
FIG. 8 is a block diagram of the electronic bag in accordance with the embodiment of the present disclosure.

Referring to FIG. 8, in the embodiment, the electronic bag further includes an audio player 40. The first touch panel 31 is electronically coupled to the audio player 40 to control playback of audio signals. The first touch panel 31 can be configured to control the display screen 20 to display different patterns and control the audio player to play audio signals.

In the embodiment, by arranging the audio player 40, the electronic bag can play audio signals.

Figure 3:
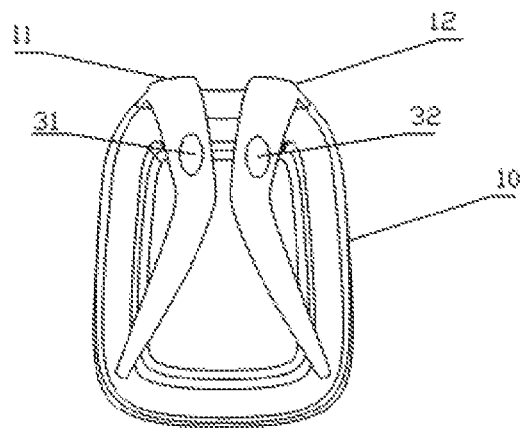
FIG. 3 is a back view of an electronic bag in accordance with another embodiment of the present disclosure, different from FIG. 2, two touch panels being shown.
Figure 4:
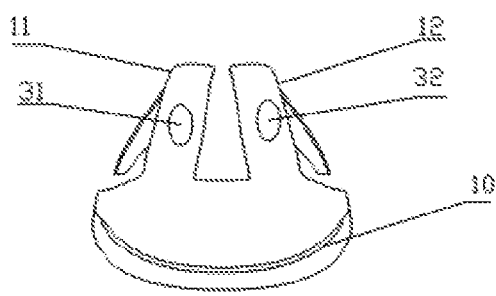
FIG. 4 is a top view of an electronic bag in accordance with the another embodiment of the present disclosure.
Figure 5:
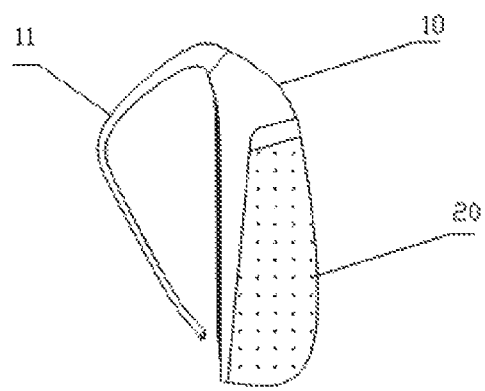
FIG. 5 is a side view of an electronic bag in accordance with the embodiment of the present disclosure.
Figure 6:
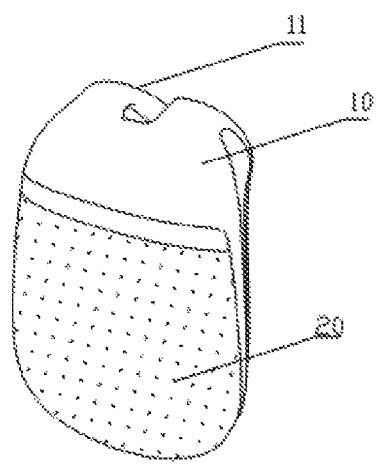
FIG. 6 is a perspective view of an electronic bag in accordance with the embodiment of the present disclosure.

As shown in FIGS. 3-4, in an alternative embodiment, the electronic bag further includes a second touch panel 32. The second touch panel 32 is electronically coupled to the audio player 40 to control playback of audio signals.

In the embodiment, the first touch panel 31 is arranged on the strap 11, and the second touch panel 32 is arranged on another strap 12. In an alternative embodiment, the second touch panel 32 and the first touch panel 31 can be both arranged on the same strap.

Figure 9:
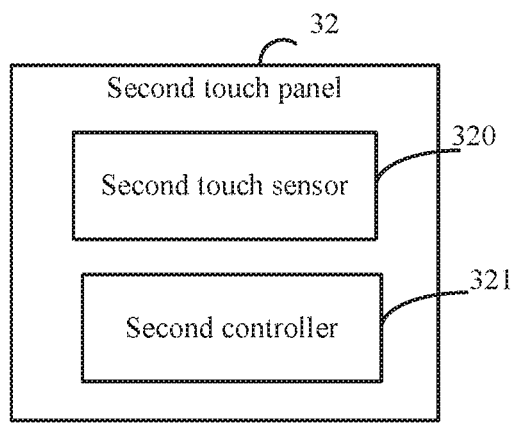
FIG. 9 is a block diagram of a second touch panel in accordance with the another embodiment of the present disclosure.

As shown in FIG. 9, specifically, the second touch panel 32 includes a second touch sensor 320 and a second controller 321. The second controller 321 may be mounted on the strap 12 of the bag body 10. Alternatively, the second controller 321 and the first controller 311 may be a same controller. That is to say, one controller may control the first touch sensor 310 and the second touch sensor 320 simultaneously. The power module is further configured to provide power to the second touch sensor 320 and the second controller 321. The second touch sensor 320 is configured to sense a touch gesture performed on the second touch panel 32, and the second controller 321 is configured to generate a control command according to the touch gesture to control the audio player 40 to play audio signals or adjust volume.

Specifically, the audio player 40 is an earphone electronically coupled to the electronic bag or a speaker of the electronic bag. The audio player 40 may be arranged on a bottom of the electronic bag.

When the user performs a touch gesture on the second touch panel 32, the second touch sensor 320 senses the touch gesture, and the second controller 321 generates a control command according to the touch gesture to control playback of audio signals or adjust volume. When the user slides upwardly or downwardly on the second touch panel 32, the audio player 40 adjusts volume of the audio signals. When the user slides towards left or right on the second touch panel 32, the audio player 40 skips to a previous or next song. Certainly, different gestures may be preset to realize different functions. For example, when the user draws "r" on the second touch panel 32, the audio player 40 will play music randomly, and when the user draws "w" on the second touch panel 32, the audio player 40 will play songs the family name of singers of which is w.

In the embodiment, by arranging the second touch panel 32 on the strap 12, the user is facilitated to control playback of audio signals by performing operations on the second touch panel 32.

Comparing with a traditional bag, besides having storage function, the electronic bag provided by the present disclosure can further display different patterns according to user's needs. Therefore, the electronic bag includes multiple functions, and possesses good application prospect.

Figure 10:
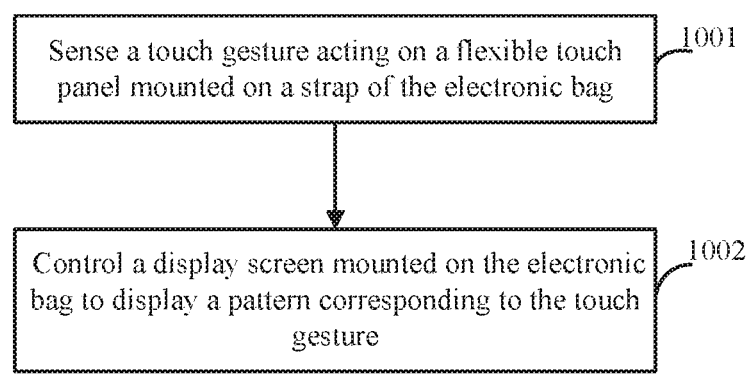
FIG. 10 is a flow chart of a method for controlling an electronic bag in accordance with an embodiment of the present disclosure.

Referring to FIG. 10, a flow chart of a method for controlling an electronic bag in accordance with an embodiment of the present disclosure is provided. The method includes step 1001 of sensing a touch gesture acting on a flexible touch panel mounted on a strap of the electronic bag, and step 1002 of controlling a display screen mounted on the electronic, bag to display a pattern corresponding to the touch gesture. The electronic bag is the same as the electronic bag described above and will not be described in detail herein.

The foregoing descriptions are merely preferred embodiments of the present disclosure, rather than limiting the present disclosure. Any modification, equivalent substitution, improvement or the like made within the spirit and principle of the present disclosure shall fall into the protection scope of the present disclosure.

What is claimed is:

1. An electronic bag comprising:
a bag body equipped with a first strap;
a display screen arranged on an external surface of the bag body; and
a first touch panel arranged on the first strap and controlling the display screen to display different patterns by sensing different touch gestures;
wherein the first touch panel comprises a first touch sensor and a first controller, the first touch sensor sensing a touch gesture performed on the first touch sensor, and the first controller controlling the display screen to display a pattern corresponding to the touch gesture; and
wherein the pattern corresponding to the touch gesture is preset and stored in the first controller beforehand.

2. The electronic bag of claim 1, wherein a track of the pattern corresponding to the touch gesture is the same as that of the touch gesture.

3. The electronic bag of claim 1, wherein the electronic bag further comprises an audio player, the first touch panel is further electrically coupled to the audio player to control audio signals of the audio player.

4. The electronic bag of claim 3, wherein the audio player is arranged on a bottom of the bag body.

5. The electronic bag of claim 1, wherein the electronic bag further comprises an audio player and a second touch panel, the second touch panel is electrically coupled to the audio player to control audio signals of the audio player.

6. The electronic bag of claim 5, wherein the second touch panel is arranged on the first strap.

7. The electronic bag of claim 5, wherein the bag body is further equipped with a second strap, and the second touch panel is arranged on the second strap.

8. The electronic bag of claim 5, wherein the second touch panel is a flexible touch panel.

9. The electronic bag of claim 5, wherein the audio player is arranged on a bottom of the bag body.

10. The electronic bag of claim 1, wherein the first touch panel is a flexible touch panel.

11. The electronic bag of claim 1, wherein the display screen is an LED lattice screen.

12. A method for controlling an electronic bag, comprising:
sensing a touch gesture acting on a flexible touch panel mounted on a strap of the electronic bag; and
controlling a display screen mounted on the electronic bag to display a pattern corresponding to the touch gesture;
wherein the electronic bag comprises a bag body, the strap is connected to the bag body; and
wherein the pattern is stored in a controller before the touch gesture is sensed, the pattern being chosen when a trace of the touch gesture meeting a trace of the pattern.

13. The method of claim 12, wherein the controller is received in the bag body.

14. The method of claim 12, wherein the flexible touch panel and the display screen are located at two opposite sides of the electronic bag, respectively.

15. The method of claim 12, wherein an area of the flexible touch panel is smaller than that of the display screen.

16. The method of claim 12, wherein the electronic bag further comprises another strap connected to the bag body, another flexible touch panel being mounted on the another strap, the another flexible touch sensing another touch gesture to control audio signal of an audio player mounted to the bag body.

17. An electronic bag comprising:
a bag body equipped with a first strap;
a display screen arranged on an external surface of the bag body; and
a first touch panel arranged on the first strap and controlling the display screen to display different patterns by sensing different touch gestures;
wherein the pattern corresponding to the touch gesture is preset and stored in a first controller beforehand.

18. The electronic bag of claim 17, wherein the first touch panel comprises a first touch sensor and the first controller, the first touch sensor sensing a touch gesture performed on the first touch sensor, and the first controller controlling the display screen to display a pattern corresponding to the touch gesture.

19. The electronic bag of claim 17, wherein the first touch panel is a flexible touch panel.

20. The electronic bag of claim 17, wherein the electronic bag further comprises an audio player, the first touch panel is further electrically coupled to the audio player to control audio signals of the audio player.

* * * * *